(12) United States Patent  (10) Patent No.: US 8,149,122 B2
Burza  (45) Date of Patent: Apr. 3, 2012

(54) LIQUID LEVEL DETECTION SYSTEM WITH FLOATING RFID TAG

(75) Inventor: Joseph K. Burza, Lockport, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 525 days.

(21) Appl. No.: 12/398,327

(22) Filed: Mar. 5, 2009

(65) Prior Publication Data

US 2009/0224930 A1 Sep. 10, 2009

Related U.S. Application Data

(60) Provisional application No. 61/034,064, filed on Mar. 5, 2008.

(51) Int. Cl.
G08B 13/14 (2006.01)
(52) U.S. Cl. .................................................. 340/572.1
(58) Field of Classification Search ............... 340/572.1, 340/505, 539.21, 539.23, 604, 623, 527; 210/104
See application file for complete search history.

(56) References Cited

U.S. PATENT DOCUMENTS

| | | | | |
|---|---|---|---|---|
| 5,856,783 A * | 1/1999 | Gibb | ............................... | 340/618 |
| 6,140,925 A * | 10/2000 | Lee et al. | ....................... | 340/618 |
| 2002/0157465 A1 * | 10/2002 | Marioni | ........................... | 73/313 |
| 2005/0099311 A1 * | 5/2005 | Eskins | ............................ | 340/616 |
| 2005/0274656 A1 * | 12/2005 | McKinney | ........................ | 210/86 |
| 2007/0103295 A1 * | 5/2007 | Forster | ....................... | 340/539.22 |
| 2008/0103295 A1 * | 5/2008 | Ho et al. | ....................... | 536/18.4 |
| 2008/0290011 A1 * | 11/2008 | Capano et al. | ................. | 210/104 |

* cited by examiner

*Primary Examiner* — Phung Nguyen
(74) *Attorney, Agent, or Firm* — Husch Blackwell LLP

(57) ABSTRACT

A wireless pump on/off system incorporates a radio receiver and an antenna. An RFID tag is carried on a float. The float can be located in a fluid whose level is to be controlled with at least a portion thereof protruding above the fluid level. Signal strength of a wireless received from the tag can be indicative of at least one fluid level, and responsive thereto a pump can be activated. The pump can be deactivated in response to another received wireless signal, loss of the activating signal indicative of another fluid level or expiration of a preset time interval.

21 Claims, 10 Drawing Sheets

RADIO FLOAT PUMP CONTROL USING PROXIMITY TO 1 ANTENNA

RADIO FLOAT PUMP CONTROL USING 2 ANTENNAS

RADIO FLOAT LEVEL NOTIFICATION USING 1 ANTENNA

RADIO FLOAT LEVEL DETECTION USING MULTIPLE ANTENNAS

US 8,149,122 B2

LIQUID LEVEL DETECTION SYSTEM WITH FLOATING RFID TAG

CROSS-REFERENCE TO RELATED APPLICATION

This application claims the benefit of the filing date of U.S. Provisional Application Ser. No. 61/034,064 filed Mar. 5, 2008 and entitled "Radio Float Liquid Level Detection System", incorporated herein by reference.

FIELD

The invention pertains to pump control systems. More particularly, the invention pertains to such systems which detect pump on/off levels of a liquid using a floating RFID tag.

BACKGROUND

Various types of level detection systems are known to control on/off pump cycles. These include mechanical as well as non-mechanical level sensors. Examples include various types of known float or diaphragm switches. Known mechanical sensors while useful suffer from wear and mechanical stresses.

Non-mechanical level sensors are known and are improvements over the mechanical units. However known non-mechanical units require routine maintenance as they are affected by their environment and can suffer from contaminant build-up, mold, dirt, corrosion was well as contaminating liquid or moisture.

DETAILED DESCRIPTION

Figure 1:
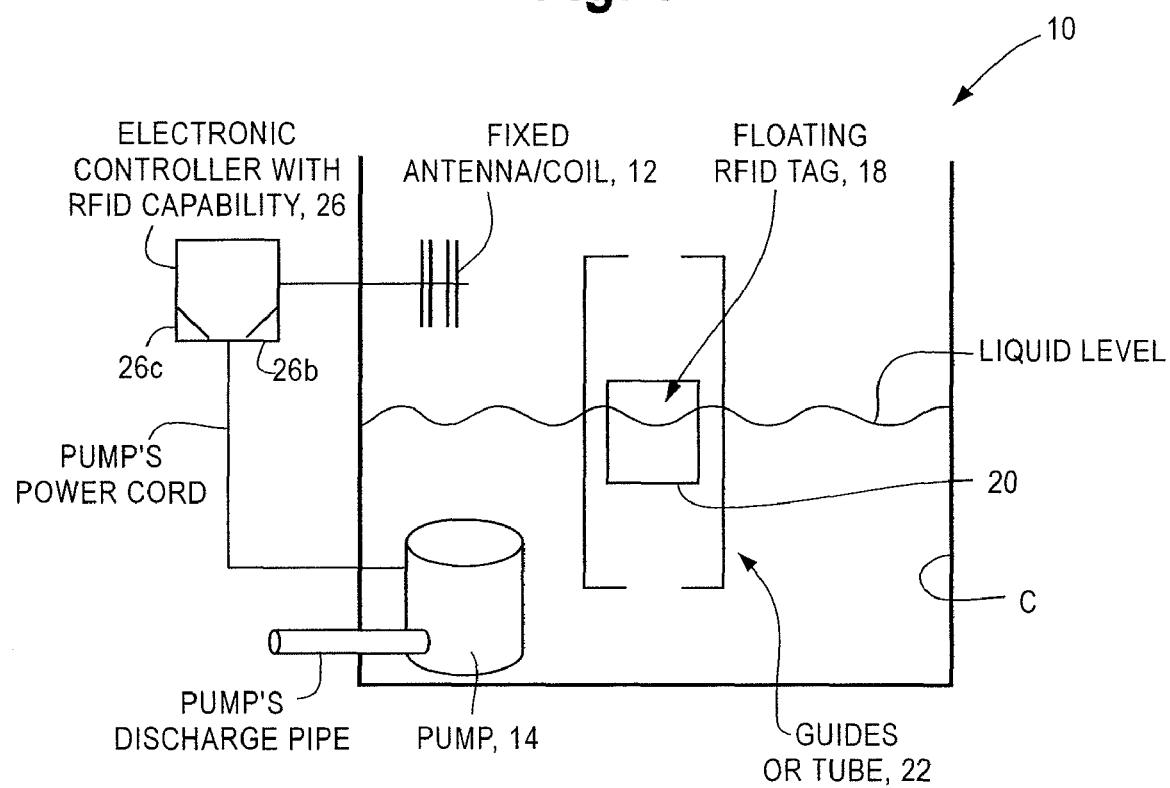
FIG. 1 is a block diagram of a single antenna pump control unit which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of the invention sense liquid levels non-mechanically so as to substantially eliminate maintenance during the life of the respective unit. In one aspect of the invention, a float can carry a radio frequency identification (RFID) tag. Radio signals from the tag, as the float moves up and down in response to level of the associated liquid, can be used to sense how far the float is from a receiving antenna, which can be fixed relative to liquid level.

A single sensing antenna can be used in one embodiment. As the level increases, the float moves closer to the antenna. When signal strength crosses a predetermined threshold, a pump can be activated to pump the level down. In one aspect, pumping can be terminated after a pre-determined time interval. In another aspect, pumping can continue until signal strength from the floating tag falls below a predetermined level.

In another embodiment, two spaced apart antennas can be used to establish that the float is near either a lower level or an upper level. In yet another aspect of the invention, additional antennas can be provided to sense a pre-flood condition.

The antenna(s) can be coupled to a receiver and control circuits to establish when to turn the pump on and off based on signals from the RFID tag on the float. Activating RF signals can be transmitted into the vicinity of a passive-type tag to energize same.

In another aspect of the invention, multiple RFID tags can be floated simultaneously, on a common float or different floats to provide redundant level control signals. In the following discussion of the figures, the same identification numerals are used on various figures for common elements.

FIG. 1 illustrates an RFID system 10 with one "waterproof" antenna 12 to detect an increasing liquid level and control a pump (like a residential sump pump) 14. It uses a method of antenna-to-RFID tag proximity to sense a liquid's level. An RFID tag 18 is part of a floating housing 20 which is kept from drifting away from the antenna 12 via stationary guides or a tube 22. The antenna 12 may also be attached to the guide(s) 22. When the tag 18 is close enough to be read by an RFID electronic controller 26 via its antenna 12, pump 14 can be turned on to empty the "container" or pump c as a predetermined liquid level has been reached. Once the electronic controller 26 can no longer communicate with the tag 18, the attached pump 14 is turned off.

Figure 1A:
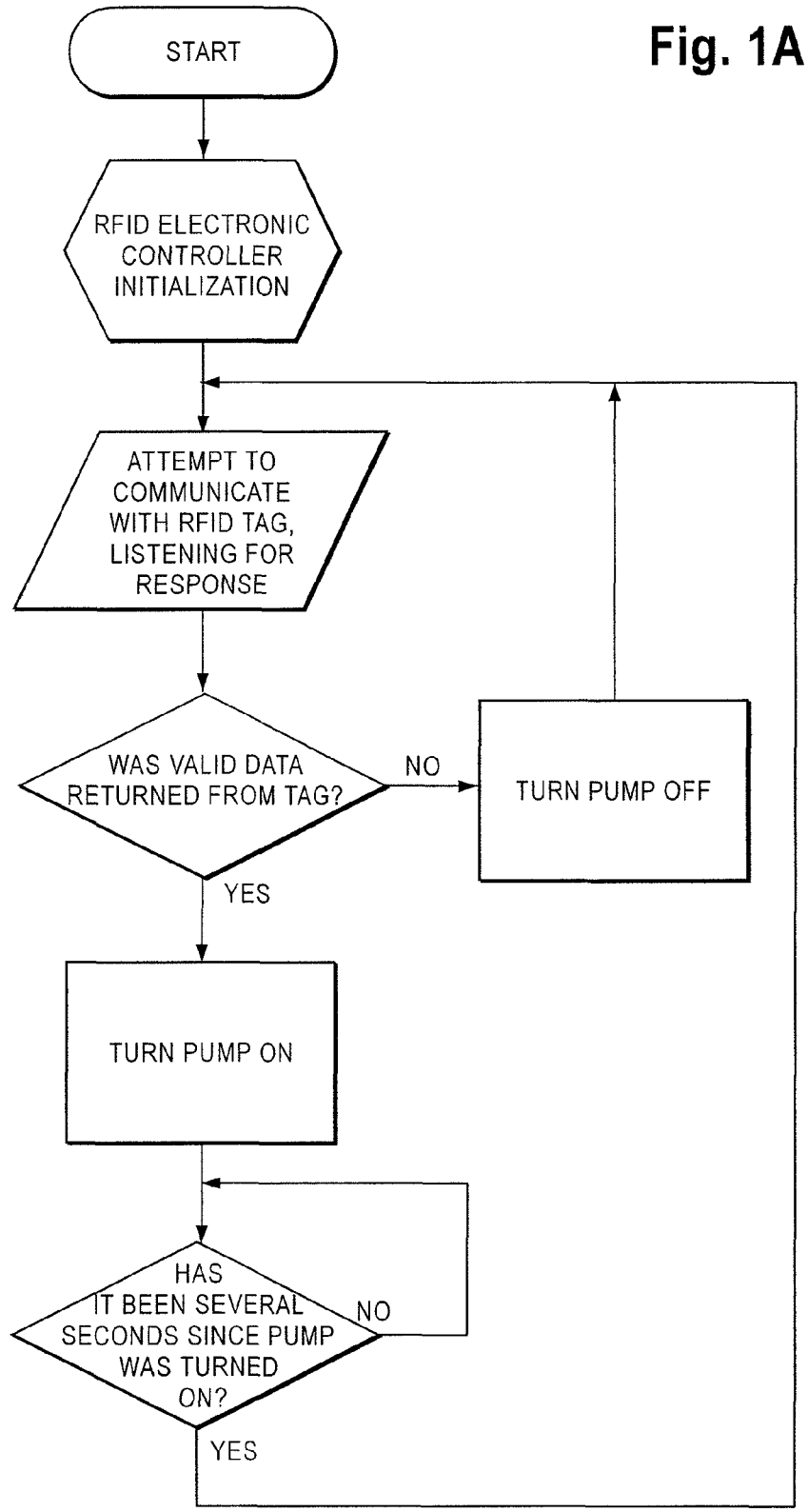
FIG. 1A is a flow diagram of processing in the system of FIG. 1.

In another variation of system 10 the electronic controller 26 can turn a "filling" pump off when the tag 18 can communicate with the controller; and then turn it back on when communication is lost. This would be useful in applications such as a city water tower, or other reservoir. FIG. 1A is a flow diagram which illustrates exemplary processing carried out by system 10.

Figure 2:
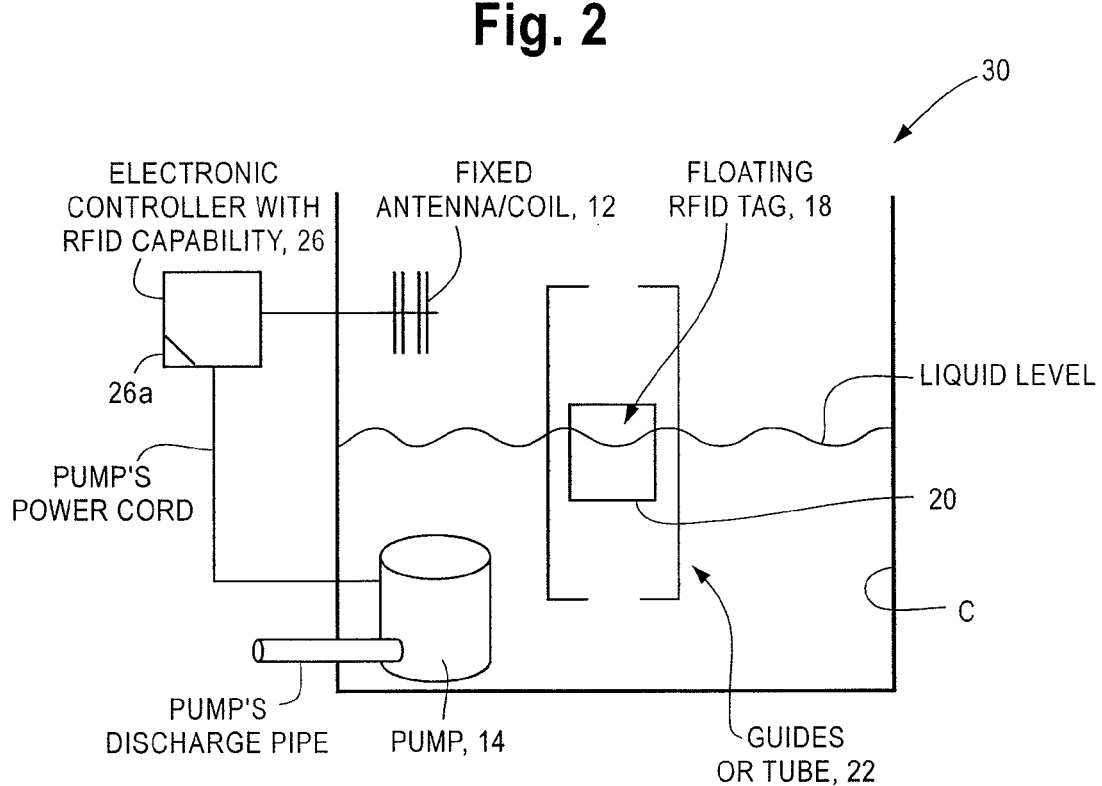
FIG. 2 is a block diagram of another single antenna pump control unit which embodies the invention.

FIG. 2 illustrates an implementation 30 that uses an RFID system 30 with one "waterproof" antenna 12 and a timer 26a to detect an increasing liquid level and control a pump (like a residential sump pump) 14. An RFID tag 18 is part of a floating housing 20 which is kept from drifting away from the antenna 12 via stationary guides or a tube 22. The antenna 12 may also be attached to the guide(s) 22. When the tag 18 is close enough to be read by the RFID electronic controller 26 via its antenna, a pump 14 can be turned on to empty the "container" or pump c since the predetermined liquid level has been reached. After a predetermined period of time (counted down by a timer 26a inside the electronic controller 26), the pump 14 is turned off.

Figure 2A:
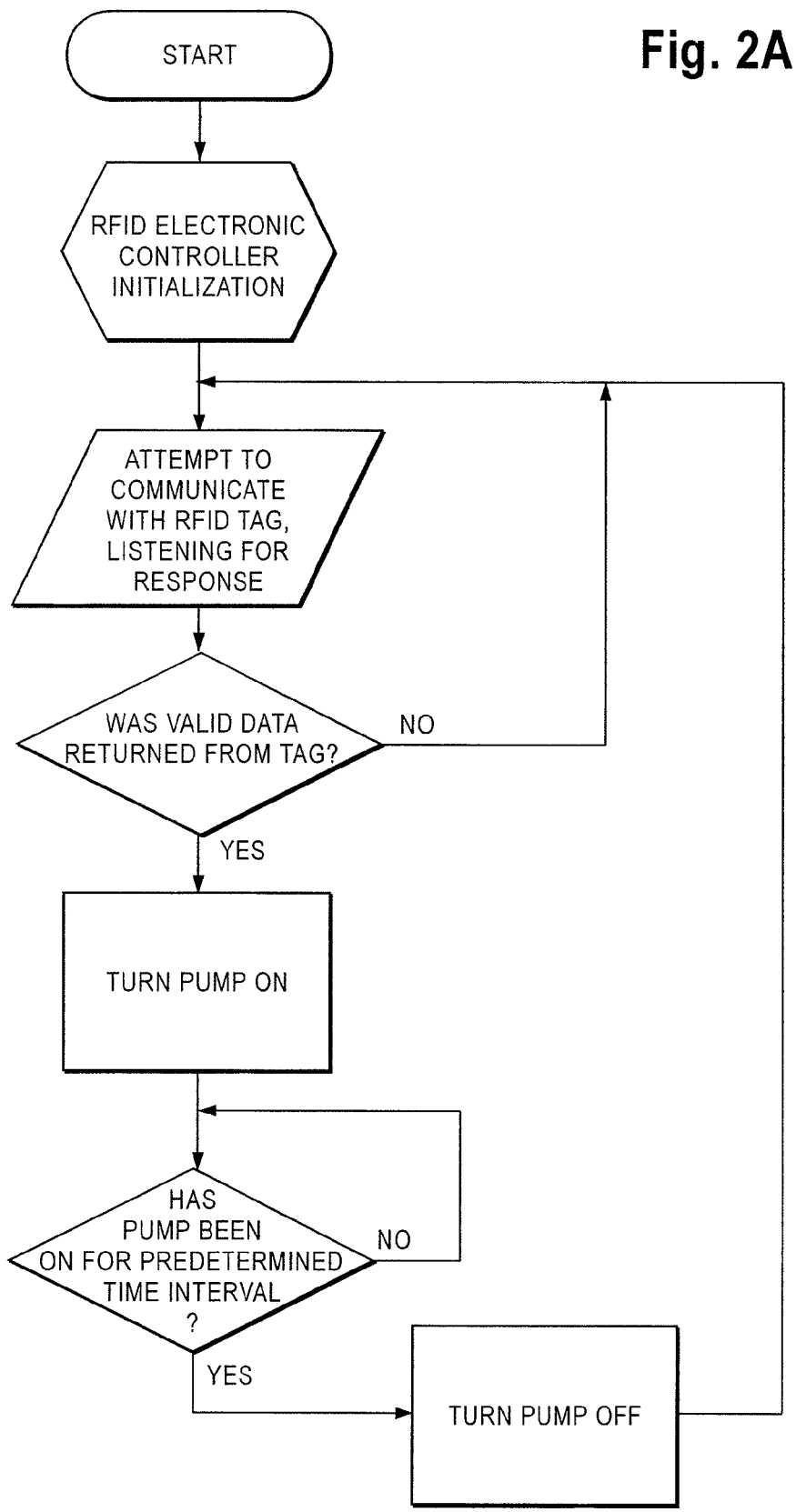
FIG. 2A is a flow diagram of processing in the system of FIG. 1.

In another variation of system 30 the electronic controller 26 turns a "filling" pump off when the tag 18 can communicate with the controller; and then turns it back on after a predetermined period of time (counted down by a timer 26a inside the electronic controller). This could be useful in applications such as a city water tower, or other reservoir. FIG. 2A is a flow diagram which illustrates exemplary processing carried out by system 30.

Figure 3:
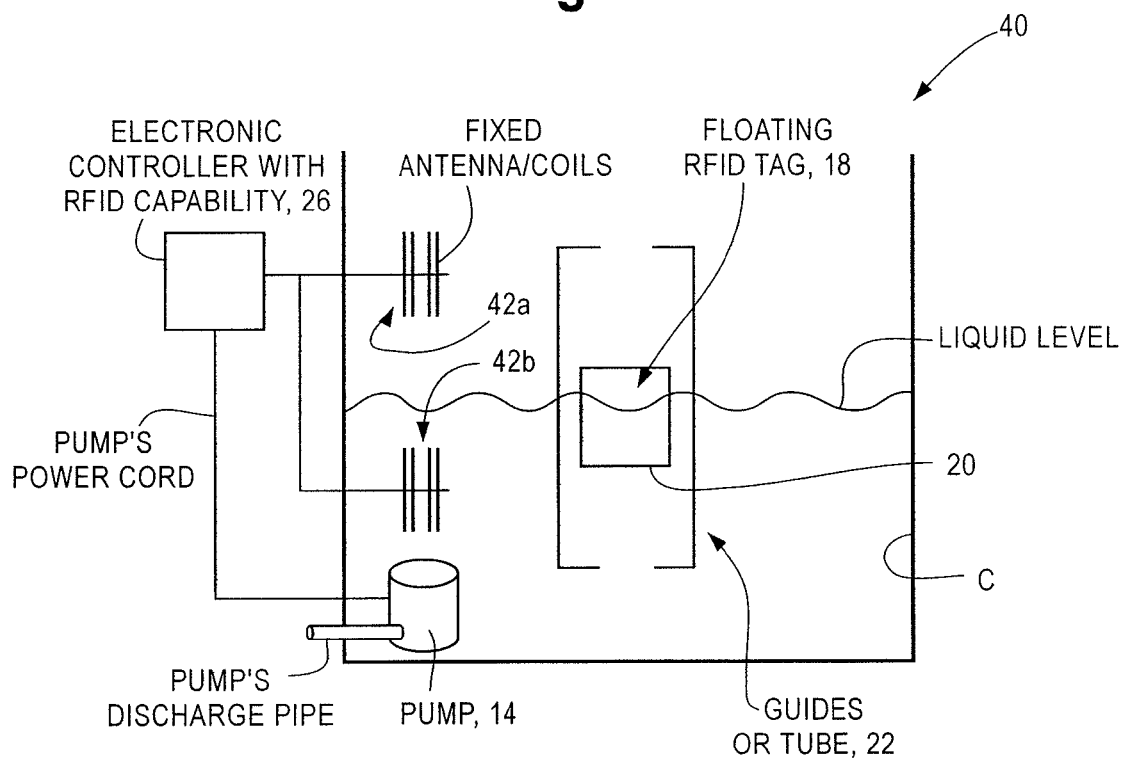
FIG. 3 is a block diagram of a dual antenna pump control unit which embodies the invention.

FIG. 3 illustrates an RFID system 40 with two "waterproof" antennas 42a,b and a discharge pump 14 to keep an increasing liquid level within a predetermined height range (as in a residential sump pit). An RFID tag 18 is part of a floating housing 20 which is kept from drifting away from the antennas 42a,b via stationary guides or a tube 22. The antennas 42a,b may also be attached to the guide(s) 22. When the tag is close enough to be read by the RFID electronic controller 26 via its topmost antenna 42a, a pump 14 can be turned on to discharge liquid from the "container" or pump c. The pump 14 is turned off when the electronic controller 26 can communicate with the tag 18 via its bottommost antenna 42b.

Figure 3A:
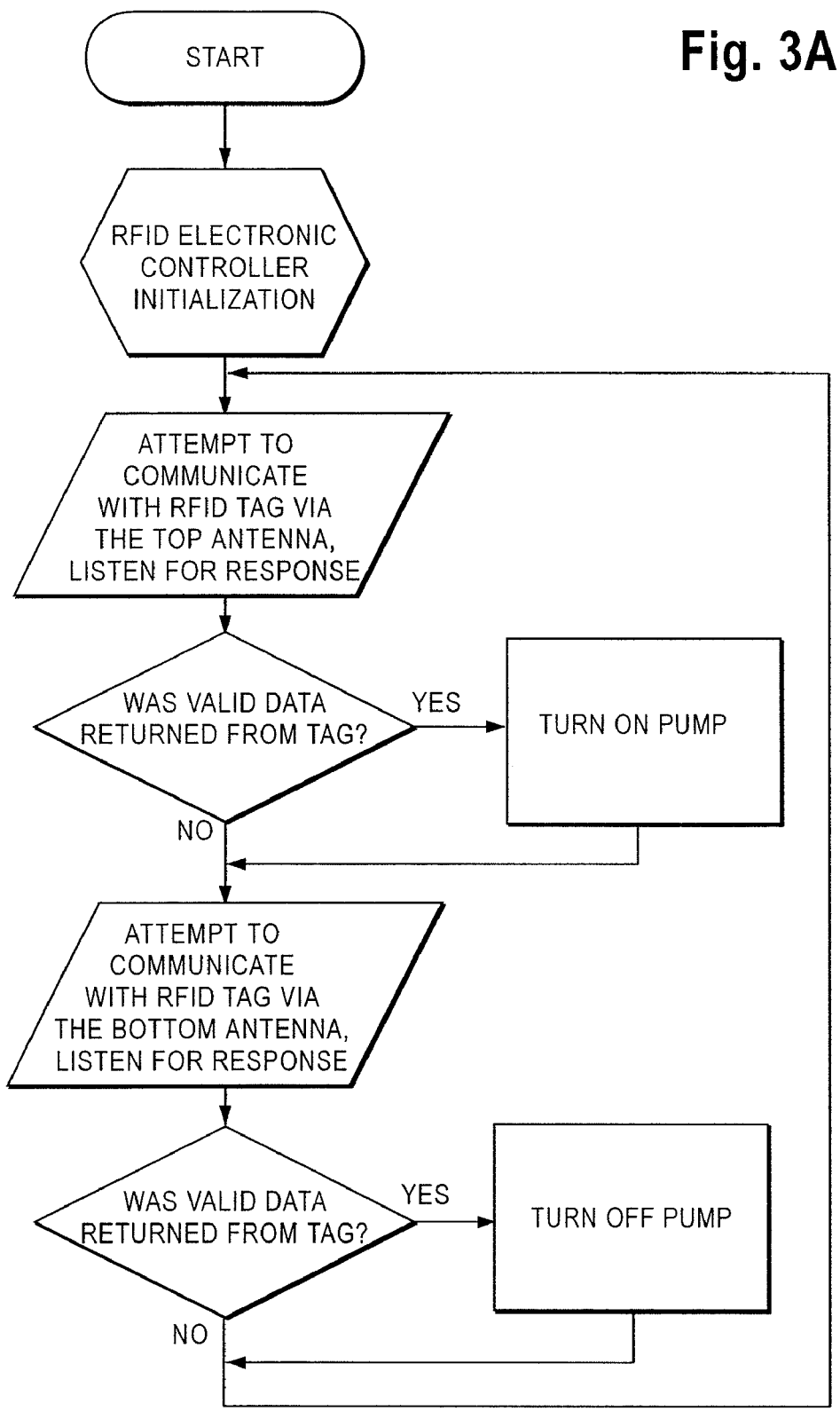
FIG. 3A is a flow diagram of processing in the system of FIG. 1.

In another variation of system 40 the electronic controller 26 turns a "filling" pump off when the tag 18 can communicate with the controller via its topmost antenna 42a; and then turns it back on when the controller can communicate with the tag via its bottommost antenna 42b. This would be useful in applications such as a city water tower, or other reservoir. FIG. 3A illustrates a flow diagram of exemplary processing carried out by system 40.

Figure 4:
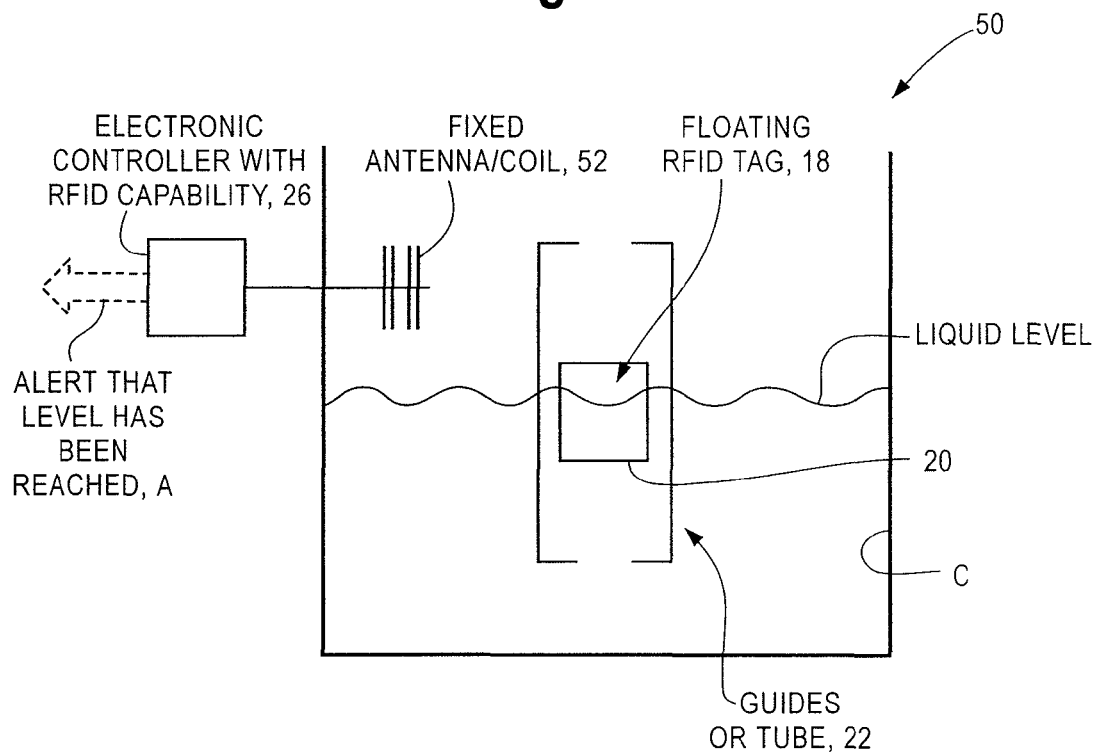
FIG. 4 is a block diagram of a single antenna level notification unit which embodies the invention.

FIG. 4 illustrates an RFID system 50 with one "waterproof" antenna 52 to detect an increasing liquid level and then initiate an appropriate notification. An RFID tag 18 is part of a floating housing 20 which is kept from drifting away from the antenna 52 via stationary guides or a tube 22. The antenna 52 may also be attached to the guide(s) 22. When the tag 18 is close enough to be read by the RFID electronic controller 26 via its antenna 52, a notification or alert A (such as an alarm notice) can be initiated as the predetermined liquid level has been reached. These notifications are triggered by the electronic controller 26 and can be audible or visual, including buzzers, lights, emails, etc. They can be activated immediately or after a predetermined period of time (counted down by a timer such as 26a inside the electronic controller 26).

Figure 4A:
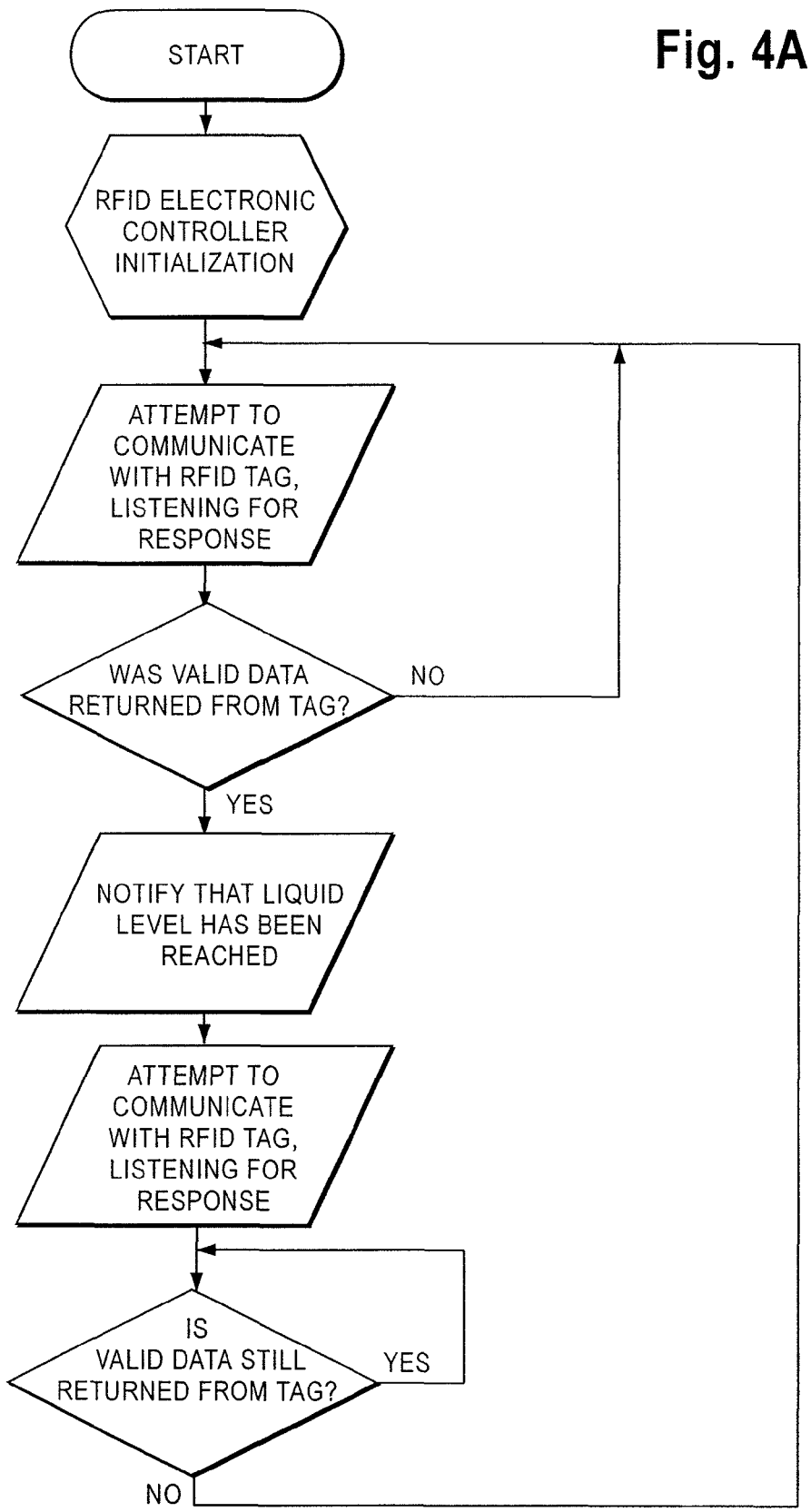
FIG. 4A is a flow diagram of processing in the system of FIG. 1.

In a variation of system 50 the electronic controller 26 initiates a notification when it is unable to communicate with the tag 18, that is, when the fluid level has fallen below a predetermined level. FIG. 4A is a flow diagram which illustrates exemplary processing carried out by system 50.

Figure 5:
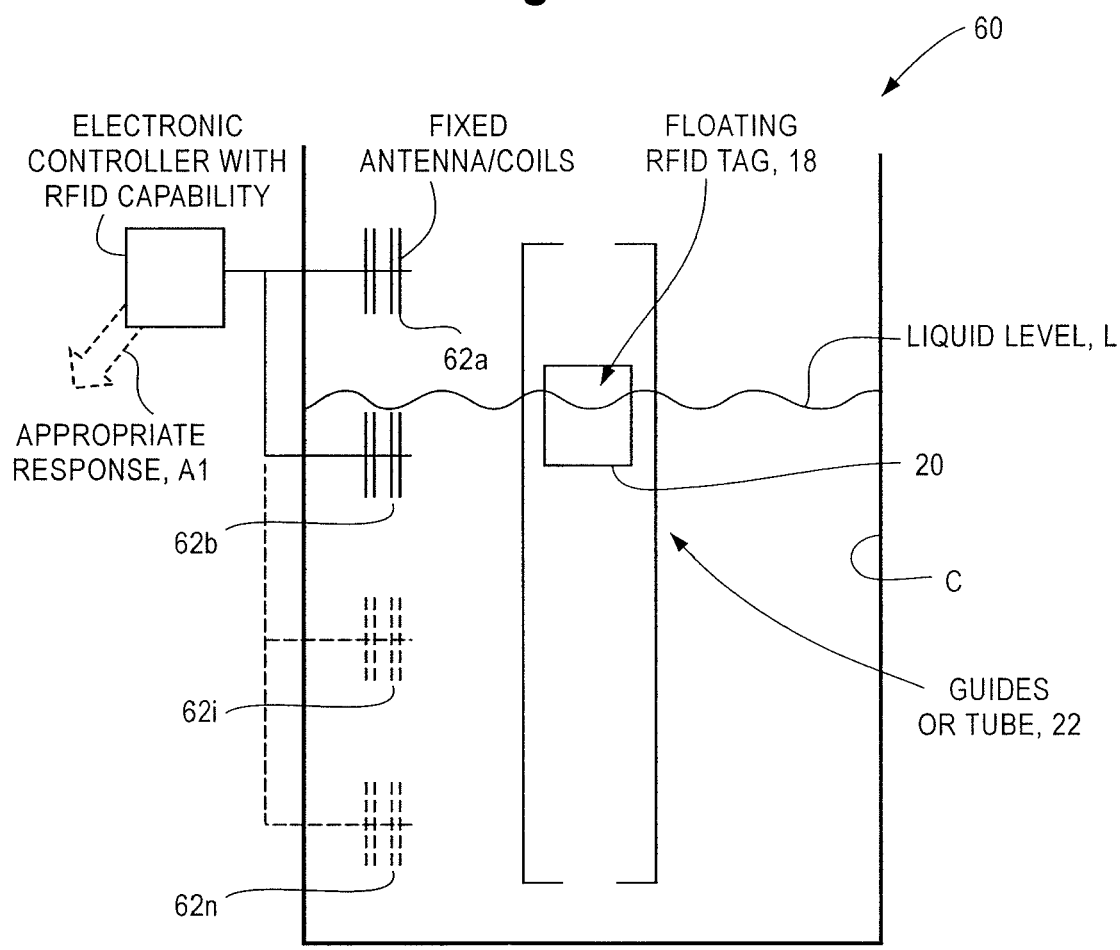
FIG. 5 is a block diagram of a multiple antenna level notification unit which embodies the invention.
Figure 5A:
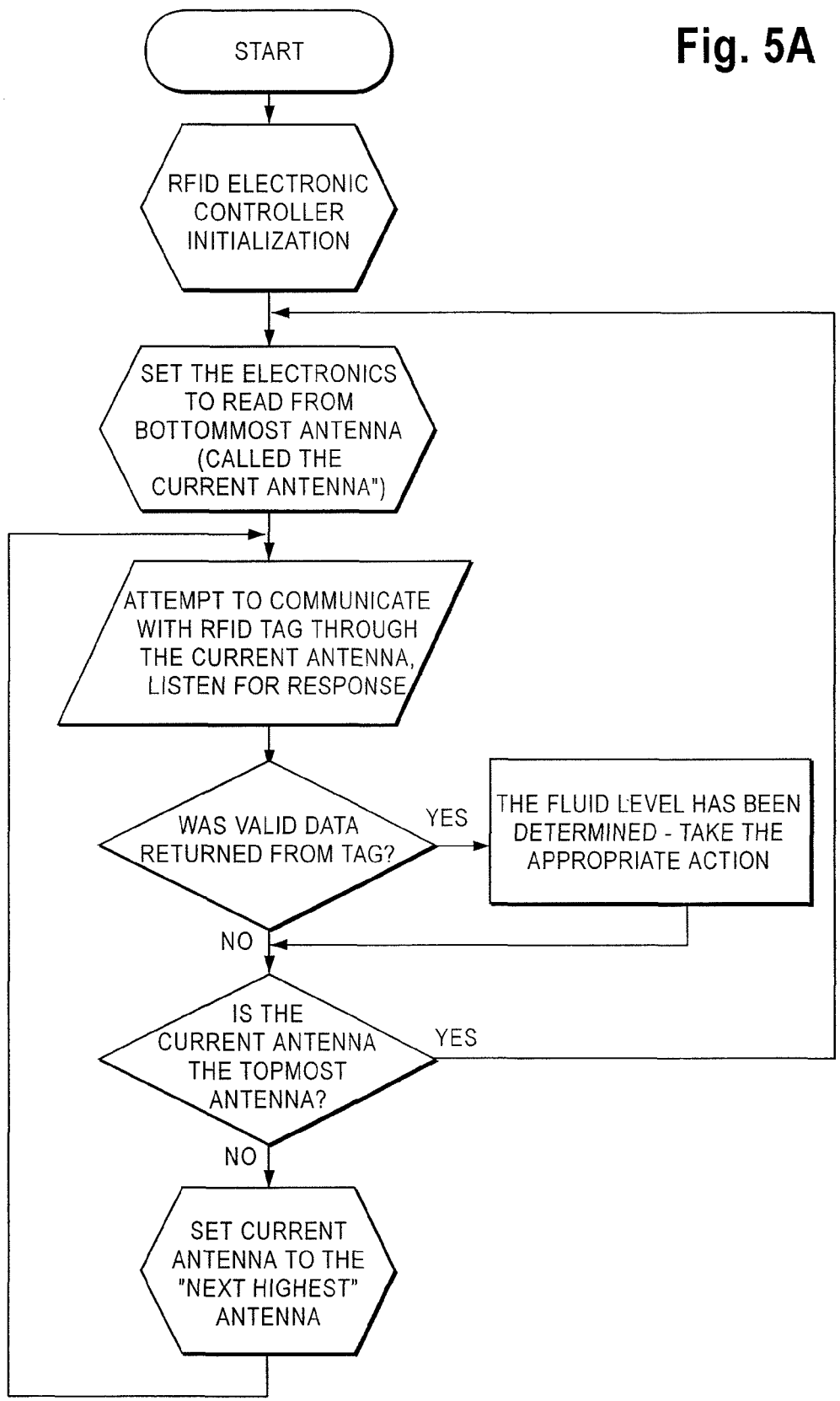
FIG. 5A is a flow diagram of processing in the system of FIG. 1.

FIG. 5 illustrates an RFID system 60 with a plurality of "waterproof" antennas 62a,b,c, . . . , to incrementally measure a liquid's level L. An RFID tag 18 is part of a floating housing 20 which is kept from drifting away from the antennas 26i via stationary guides or a tube 22. The antennas 62a,b . . . , may also be attached to the guide(s) 22. When the tag 18 is close enough to be read by the RFID electronic controller 26 via an antenna 62i, the controller can respond to the liquid level being closest to that antenna 62i and can act appropriately. Reaction to this monitoring can be an audible or visual notification or alert A, and/or automatic control over a process or machine, like a pump or valve, etc. FIG. 5A is a flow diagram which illustrates exemplary processing carried out by system 60.

It will be understood that controller 26 can be implemented, in part, with a programmable processor 26b and executable control software 26c, best seen in FIG. 1. The software 26c can be stored in computer readable storage units such as read-only or read-write memory. Processor 26 in combination with software 26c can implement the above-described functionality of systems 10-60.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A control unit for a pump comprising:
a float which carries a radio frequency identification tag;
an antenna to receive signals from the tag;
control circuits coupled to the antenna that transmit activating radio frequency signals into a vicinity of the radio frequency identification tag to energize the radio frequency identification tag and that evaluate a distance parameter between the antenna and the radio frequency identification tag based upon a signal strength from the radio frequency identification tag crossing a predetermined threshold value, and responsive thereto generate at least a pump on signal.

2. The unit as in claim 1 where the antenna is coupled to a receiver which generates an output from the tag which is coupled to the control circuits.

3. The unit as in claim 2 which includes circuitry to generate activating radio signals to energize the tag.

4. The unit as in claim 2 where the control circuits respond to an end of a predetermined time interval to terminate the pump on signal.

5. The unit as in claim 2 where the control circuits respond to a loss of signal from the tag to terminate the pump on signal.

6. The unit as in claim 2 which includes a plurality of floats, each of which carries at least one radio frequency identification tag.

7. The unit as in claim 1 which includes a second antenna, displaced from the first antenna where the control circuits are coupled to the second antenna, and where the control circuits evaluate a distance parameter between the second antenna and the tag to generate a pump off signal.

8. The unit as in claim 7 where the control circuits include a pump connect port which outputs at least a pump on signal.

9. The unit as in claim 8 where the signal from the port can activate a pump coupled to the port.

10. The unit as in claim 1 which includes a pump output switch with an input coupled to the control circuits, the input receives the pump on signal, and a switchable pump output terminal.

11. A method comprising:
providing at least one floatable source of identifying wireless signals;
energizing the source of identifying wireless signals by transmitting activating radio frequency signals into a vicinity of the source of identifying wireless signals; and
sensing wireless signals from the source, and responsive to a signal strength indicium of the sensed wireless signals crossing a predetermined threshold relative to a first location, generating a pump control signal.

12. The method as in claim 11 which includes sensing wireless signals from the source, and responsive to a signal strength indicium relative to a second location, terminating the pump control signal.

13. The method as in claim 12 which includes providing wireless power signals in the vicinity of at least the first location.

14. The method as in claim 11 which includes at least one of, terminating the pump control signal subsequent to passage of a selected time interval, or, terminating the pump control signal in response to sensing a second, lower signal strength indicium.

15. The method as in claim 11 which includes providing a plurality of floatable sources of identifying wireless signals.

16. A pump control system comprising:
a hollow housing;
a float that moves up and down within the housing;
a radio frequency identification tag carried by the float;
a wireless receiver carried in the housing;
at least one wireless signal input port carried by the housing and coupled to the receiver;
control circuits carried in the housing, coupled to the receiver that transmits activating radio frequency signals into a vicinity of the radio frequency identification tag to energize the radio frequency identification tag where the control circuits evaluate a strength parameter of received wireless signals from the radio frequency identification tag, and responsive to the received wireless signals from the radio frequency identification tag crossing a predetermined threshold value generate a pump on signal; and a pump on signal output port coupled to the control circuits.

17. The system as in claim 16 where the control circuits evaluate a second strength parameter, and responsive thereto, terminate the pump on signal.

18. The system as in claim 17 which includes at least one antenna coupled to the wireless signal input port.

19. The system as in claim 18 which includes a second wireless signal input port and a second antenna coupled thereto.

20. The system as in claim 19 where the antennas are each mounted on an elongated member, spaced apart from one another.

21. The system as in claim 16 where the control circuits terminate the pump on signal in response to at least one of another received wireless signal, reduction in strength parameter of the activating signal or expiration of a preset time interval.

* * * * *